(12) United States Patent
Zhang et al.

(10) Patent No.: US 12,053,879 B2
(45) Date of Patent: Aug. 6, 2024

(54) CHAIN PLATE FLEXIBLE FINGER

(71) Applicant: JIANGNAN UNIVERSITY, Wuxi (CN)

(72) Inventors: Jun Zhang, Wuxi (CN); Qiang Wang, Wuxi (CN); Dingfeng Xu, Wuxi (CN); Zhengning Tang, Wuxi (CN); Bing Lv, Wuxi (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 706 days.

(21) Appl. No.: 17/278,378

(22) PCT Filed: Sep. 4, 2019

(86) PCT No.: PCT/CN2019/104269
§ 371 (c)(1),
(2) Date: Mar. 22, 2021

(87) PCT Pub. No.: WO2020/063277
PCT Pub. Date: Apr. 2, 2020

(65) Prior Publication Data
US 2021/0347063 A1 Nov. 11, 2021

(30) Foreign Application Priority Data
Sep. 29, 2018 (CN) .......................... 201811147487.0

(51) Int. Cl.
*B25J 15/12* (2006.01)
*B25J 9/14* (2006.01)
*B25J 15/00* (2006.01)

(52) U.S. Cl.
CPC .............. *B25J 15/12* (2013.01); *B25J 9/142* (2013.01); *B25J 15/0023* (2013.01)

(58) Field of Classification Search
CPC ......... B25J 15/0023; B25J 15/12; B25J 9/142
(Continued)

(56) References Cited

U.S. PATENT DOCUMENTS 6,772,673 B2 * 8/2004 Seto .................. F15B 15/103
92/92
8,863,608 B2 * 10/2014 Fischer ................ B25J 9/142
92/92

(Continued)

FOREIGN PATENT DOCUMENTS

CN  1666720 A  9/2005
CN  101224580 A  7/2008
(Continued)

*Primary Examiner* — Dean J Kramer
(74) *Attorney, Agent, or Firm* — SZDC Law PC (57) ABSTRACT

The present invention provides a chain plate flexible finger including a chain plate framework, a pneumatic elastic bellows artificial muscle, and a plastic annular frame. The axial expansion of the elastic bellows artificial muscle is restricted by the chain plate framework to overcome the elastic force of a tension spring to bend, to generate conformal contact between one or more chain plates and an object to be gripped and generate a contact force for a gripping state. With the control of a high-speed on-off valve, the air pressure in an inner cavity of the elastic bellows artificial muscle is accurately controlled to vertically or horizontally grip a cylindrical object, a cuboid object, a spherical object or an ellipsoid object. The flexible finger has adequate flexible adaptability and a simple structure, and is reliable to use, and adapts to differently shaped objects to be gripped and vertically and transversely placed objects.

4 Claims, 6 Drawing Sheets

(58) Field of Classification Search
USPC .......................................................... 294/196
See application file for complete search history.

(56) References Cited

U.S. PATENT DOCUMENTS

| | | |
|---|---|---|
| 2015/0360372 A1 | 12/2015 | Schiettecatte et al. |
| 2016/0136820 A1* | 5/2016 | Lessing ................ B25J 15/0023 |
| | | 294/208 |

FOREIGN PATENT DOCUMENTS

| CN | 101554730 A | | 10/2009 | | |
|---|---|---|---|---|---|
| CN | 107081744 A | * | 8/2017 | .......... | B25J 15/0023 |
| CN | 107107344 A | | 8/2017 | | |
| CN | 108436952 A | * | 8/2018 | .......... | B25J 15/0009 |
| CN | 109262646 A | | 1/2019 | | |

* cited by examiner

CHAIN PLATE FLEXIBLE FINGER

FIELD OF THE INVENTION

The present invention relates to the field of industrial robot technology, and more particularly to a chain plate flexible finger.

DESCRIPTION OF THE RELATED ART

For large-scale production in the light industry and food industry, to meet the requirements of the logistics and packaging of raw materials, semi-finished products, and finished products with complex shapes and various properties of matter, an end gripper for gripping in logistics is required to resolve the problems such as high labor costs and poor labor conditions in simple labor. The complex targets to be gripped includes: (1) objects (melons, fruits, and vegetables) with irregular shapes and varying sizes; (2) fragile brittle objects (eggs, glassware, and ceramics); (3) easily deformable soft objects (bread and soft pack articles); (4) hardly sortable objects (wine bottles and cosmetic bottles) with varied shapes and disorderly position states. As can be seen from above, complex targets have greatly varying material characteristics, shape sizes, and position states.

SUMMARY OF THE INVENTION

A conventional industrial manipulator (end gripper) is a clamp structure or parallel movement structure and can only grip rigid workpieces that have the same shape and size and consistent position state and do not break easily. A humanoid dexterous hand needs to perceive the spatial position and shape of a complex target and needs to accurately control movement and a grip force, or otherwise it may damage or fail to reliably grip the complex target. However, at present, a humanoid dexterous hand is still in the stage of laboratory research.

At present, the structure of a soft-bodied robot may generally include a hydrostatic skeleton structure and a muscular hydrostatic skeleton structure. For most mollusks (for example, a worm and a sea anemone), a typical structure is a hydrostatic skeleton structure in which a muscle forms a closed cavity filled with a body fluid. The muscular hydrostatic skeleton structure does not have a closed fluid cavity. A typical muscular hydrostatic skeleton structure is formed by a transverse muscle and a vertical muscle that interact with each other. When the transverse muscle contracts, the body extends vertically. When the vertical muscle contracts, the body extends transversely, and the volume remains unchanged. Mammalian tongues, elephant trunks, and octopus arms are all muscular hydrostatic skeleton structures. A soft-bodied robot simulates a mollusk in the nature and is made of a soft material that can withstand large strain and has infinite degrees of freedom and continuous deformability, and can change its shape and size at will within a large range. Therefore, the soft-bodied robot can change the configuration, to enable a soft-bodied manipulator formed by the soft-bodied robot to reach any point within a working space.

Because of low impedance to pressure, the soft-bodied manipulator may conform to a contact object in a flexible deformation manner to significantly reduce a contact force, to have adequate application potential in gripping soft and fragile objects. The advantages of the soft-bodied robot (manipulator) are adequate structural flexibility and movement flexibility, a large degree of freedom, and high adaptability. As for the disadvantages, the payload capability is limited, fingers are prone to lateral bending or twisting movement, and airbags in the fingers deform greatly in a nonlinear manner, which adversely affects the mechanical modeling analysis of the fingers.

In view of the foregoing disadvantages in the existing production technology, especially for the foregoing complex grip targets, the present invention provides a chain plate flexible finger with an appropriate structure. The chain plate flexible finger is connected to an industrial robot body for use and combines the advantages of a soft-bodied robot and a rigid dexterous manipulator to overcome the deficiency of the contradiction between an applicable range and an appropriate grip force. An object is reliably gripped in an enveloping manner, or an irregularly-shaped ultra-flexible elastic framework is directly driven to make an end elastically deform, to reliably grip an object in a pinching manner. During the gripping of a complex target, the finger has a wider grip range, achieves a flexible adaptive grip effect, can adapt to varying object sizes and different shapes, and is applicable to production and logistics fields such as the gripping and sorting of food, agricultural products, and light industry products.

The technical solution utilized in the present inventions is as follows:

A chain plate flexible finger includes an elastic bellows artificial muscle, where the elastic bellows artificial muscle is a tubular structure provided with an inner cavity in the middle, the tubular structure has a corrugated outer wall and an upper opening end. The upper opening end is connected to a hose coupling by a clamp, an air pipe coupling is mounted on a side surface of the hose coupling, and a finger mounting plate is fixed on a top surface of the hose coupling by a screw; and a plastic annular frame is mounted in a trough of the corrugated outer wall of the elastic bellows artificial muscle, a chain plate is mounted at a gap between two adjacent plastic annular frames, and a plurality of chain plates are sequentially hinged in an axial direction on a side of the outer wall of the elastic bellows artificial muscle; and the chain plate flexible finger further includes a tension spring, the tension spring is mounted between an inner wall of the chain plate and the outer wall of the elastic bellows artificial muscle, and is fixed by the plastic annular frame.

A further technical solution of the present invention is as follows:

A mounting structure of the plastic annular frame includes an annular section, where the annular section is sleeved in the trough of the outer wall of the elastic bellows artificial muscle, a side plate is extended outward from a side of the annular section, an end portion of the side plate is hinged to two chain plates which are respectively located above and below the side plate by one hinge core shaft, and two ends of the side plate are respectively provided with a cylindrical rod connected to spring hooks at two ends of the tension spring.

Two hinge seats are provided at each of an upper end and a lower end of each chain plate, the end portion of the side plate is clamped at a gap between the two hinge seats at the upper end of each chain plate, and the two hinge seats at the upper end of each chain plate are fastened between the two hinge seats at the lower end of a chain plate located above the each chain plate.

The plastic annular frames are mounted in the troughs of the outer wall of the elastic bellows artificial muscle at equal intervals.

The length of the chain plate is an integer multiple of a corrugation pitch of the elastic bellows artificial muscle.

A tension spring is provided between two adjacent plastic annular frames.

A seal ring is mounted between the air pipe coupling and the hose coupling.

The elastic bellows artificial muscle is made of a rubber material.

Beneficial Effects:

The present invention has a compact and appropriate structure, which has convenient operations, reliable use as well as adequate flexible adaptability. An elastic bellows artificial muscle in an appropriate original state is selected, a chain plate having an appropriate length is selected, the positions of the plastic annular frames are adjusted in different troughs of the elastic bellows artificial muscle, and an appropriate tension spring is selected, to meet the requirement of safely gripping special grip targets (for example, soft materials such as paper cups or peaches) with different shapes, sizes, and materials. In addition, the present invention further has the following advantages:

1. The present invention has a chain plate framework and meets the characteristics of an articulated manipulator. All joints only generate angular displacements in the same plane, so that a contact force for gripping is large and the range of gripping is wide.

2. With the control of a high-speed on-off valve, the air pressure in an inner cavity of the elastic bellows artificial muscle is accurately controlled to vertically grip a cylindrical object, a cuboid object, a spherical object or an ellipsoid object, or horizontally grip a spherical object, a cylindrical object or a cuboid object, to adapt to differently shaped objects to be gripped and vertically and transversely placed objects.

3. A pneumatic system has a large gain, the elastic pneumatic bellows muscle is lightweight, and there is no seal and friction damping between a cylinder upper piston and a barrel and between a piston rod and a cylinder cover, to achieve swift response and adequate cushioning.

Where: 1. elastic bellows artificial muscle; 2, plastic annular frame; 3, hinge core shaft; 4, chain plate; 5, tension spring; 6, clamp; 7, hose coupling; 8, finger mounting plate; 9, air pipe coupling; and 10, seal ring.

DETAILED DESCRIPTION OF THE PREFERRED EMBODIMENTS

Specific embodiments of the present invention are described below with reference to the accompanying drawings.

Figure 1:
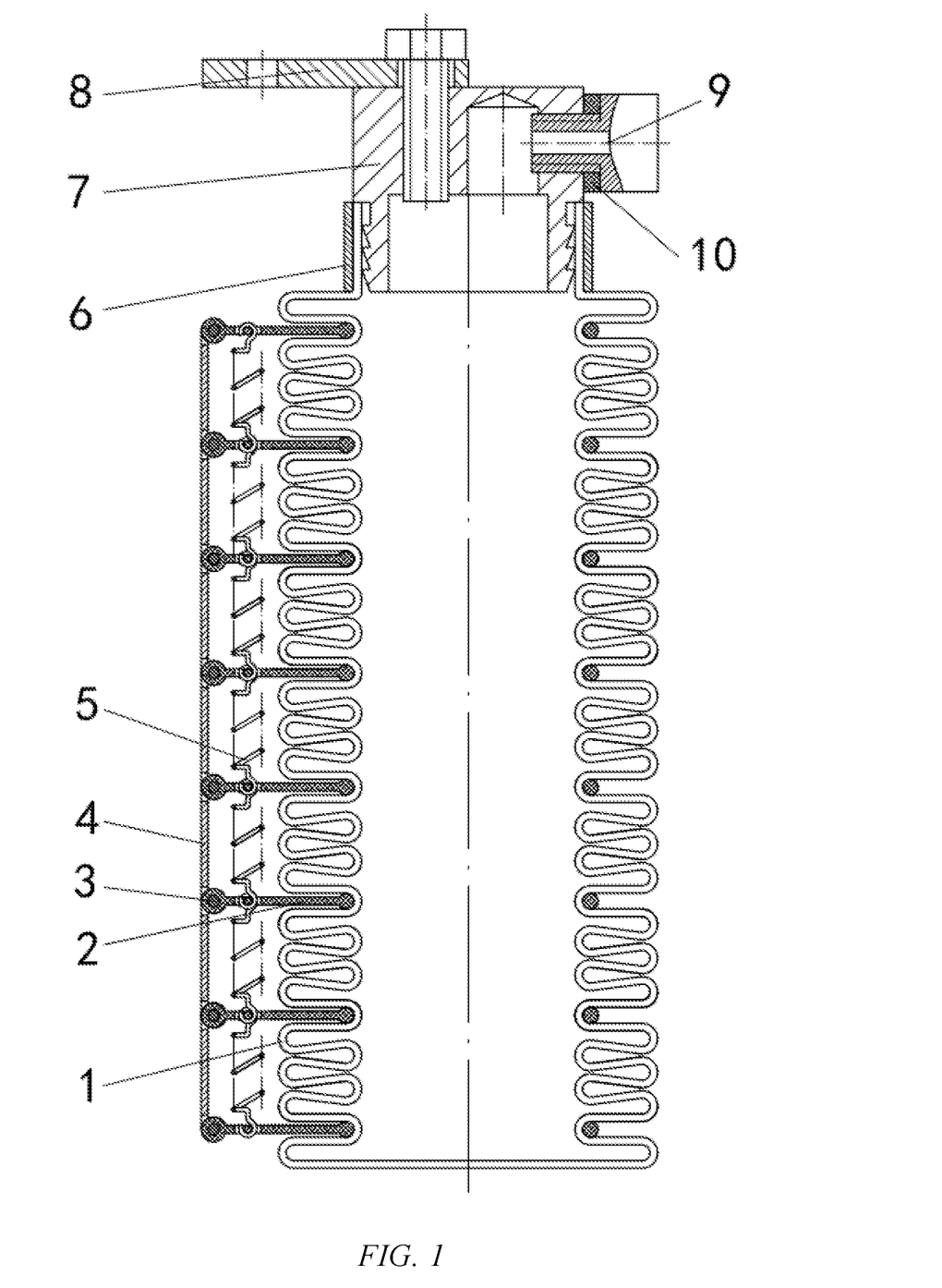
FIG. 1 is a front sectional view according to the present invention.
Figure 2:
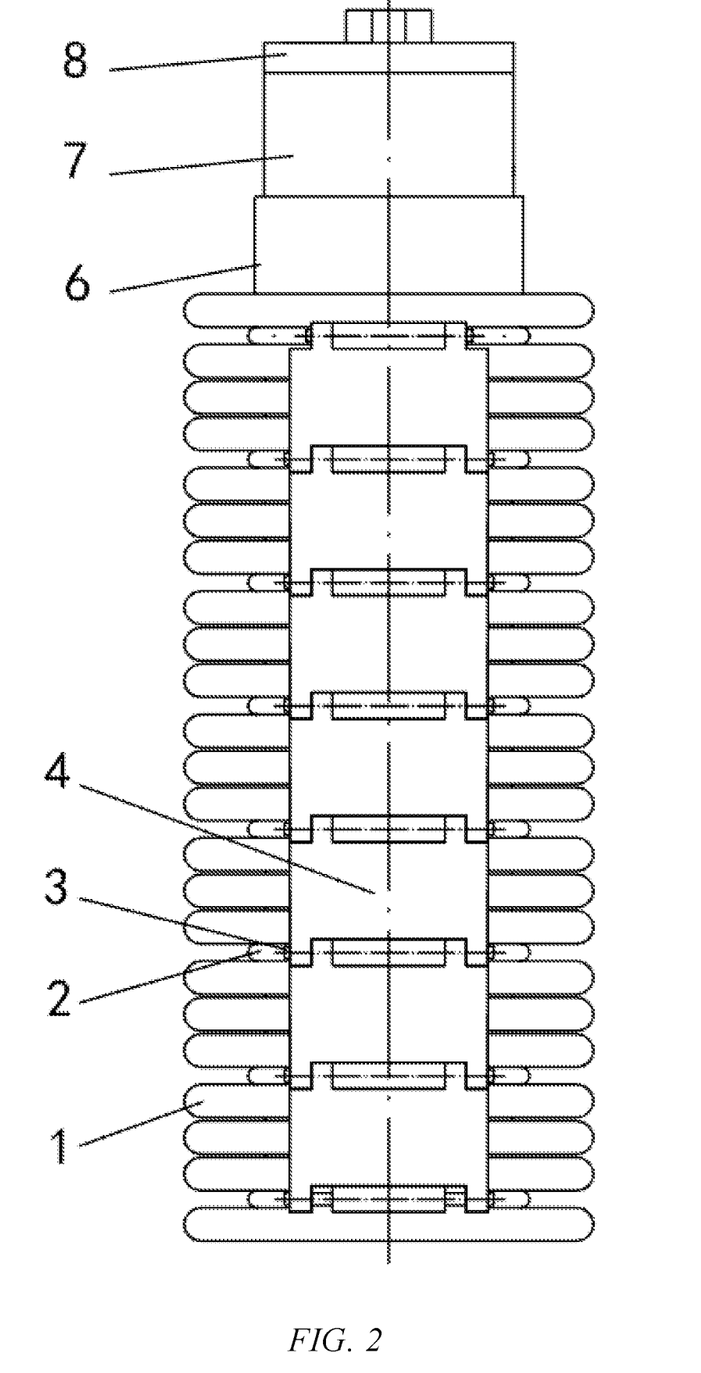
FIG. 2 is a left view according to the present invention.
Figure 3:
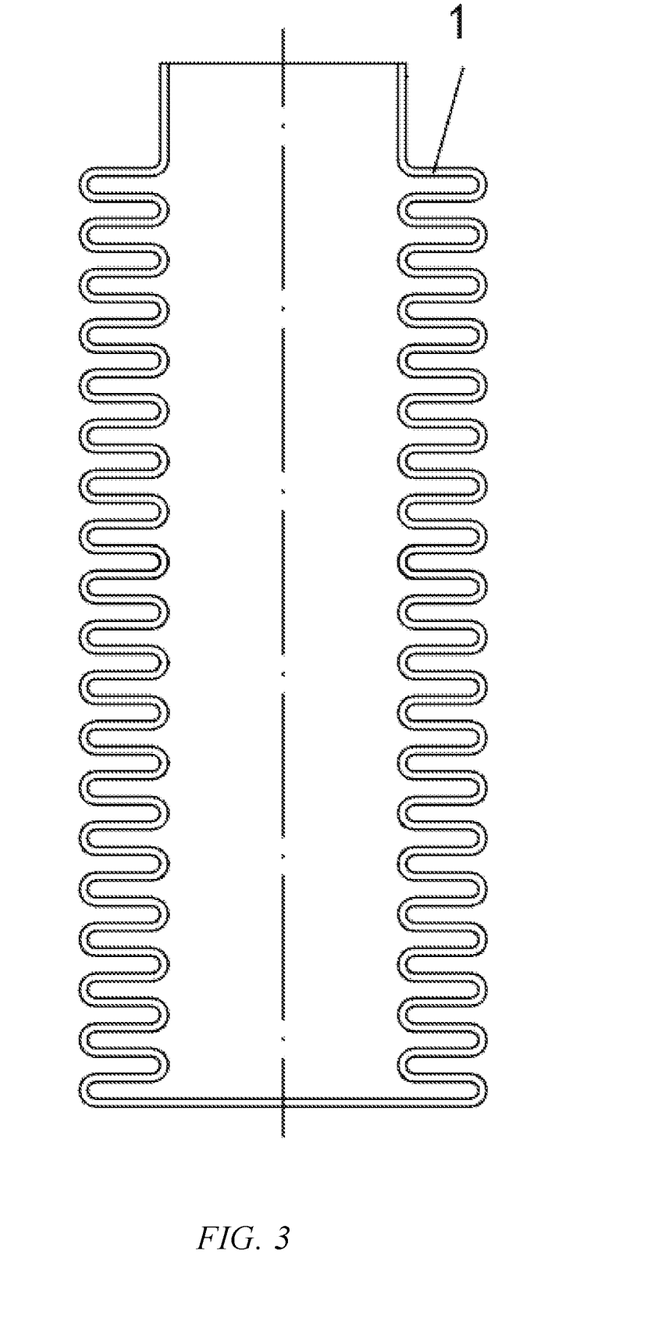
FIG. 3 is a structural view of an elastic bellows artificial muscle of the present invention.

As shown in FIG. 1, FIG. 2, and FIG. 3, a chain plate flexible finger in this embodiment includes an elastic bellows artificial muscle 1. The elastic bellows artificial muscle 1 is a tubular structure provided with an inner cavity in the middle. The tubular structure has a corrugated outer wall and an upper opening end. The upper opening end is connected to a hose coupling 7 by a clamp 6. An air pipe coupling 9 is mounted on a side surface of the hose coupling 7. A finger mounting plate 8 is fixed on a top surface of the hose coupling 7 by a screw. A plastic annular frame 2 is mounted in a trough of the corrugated outer wall of the elastic bellows artificial muscle 1, a chain plate 4 is mounted at a gap between two adjacent plastic annular frames 2, and a plurality of chain plates 4 are sequentially hinged in an axial direction at a side of the outer wall of the elastic bellows artificial muscle 1. The chain plate flexible finger further includes a tension spring 5. The tension spring 5 is mounted between an inner wall of the chain plate 4 and the outer wall of the elastic bellows artificial muscle 1, and is fixed by the plastic annular frame 2.

Figure 4:
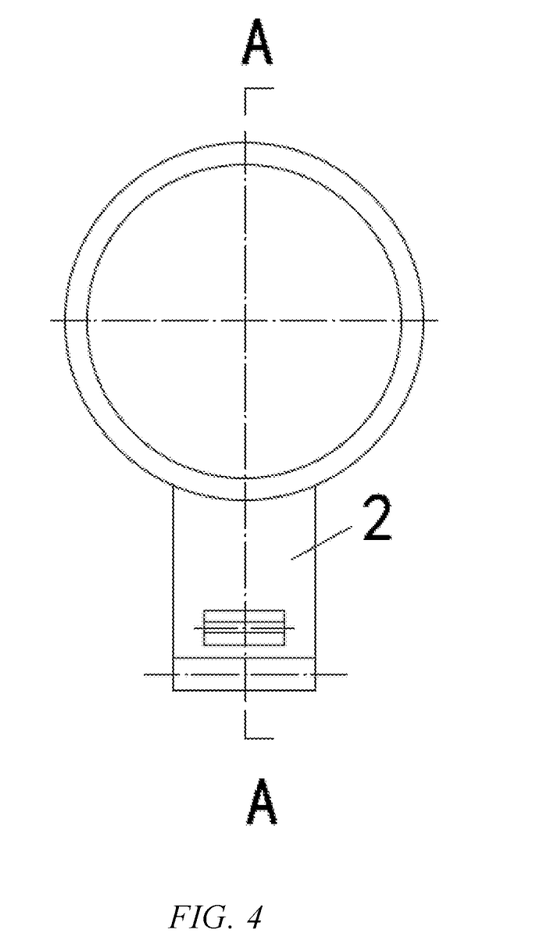
FIG. 4 is a front view of a plastic annular frame according to the present invention.
Figure 5:
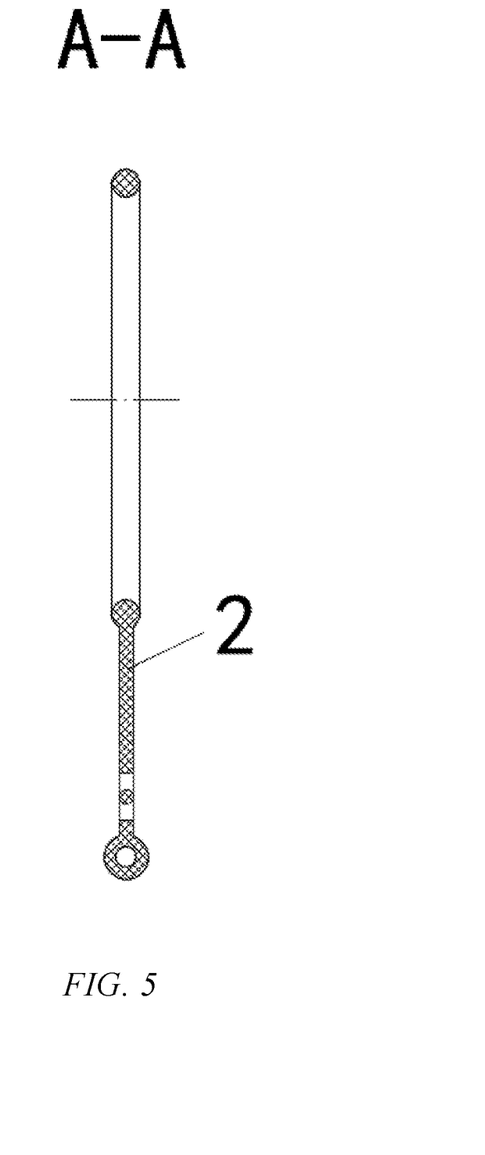
FIG. 5 is a left sectional view along a section A-A in FIG. 4.

As shown in FIG. 4 and FIG. 5, a mounting structure of the plastic annular frame 2 includes an annular section. The annular section is sleeved in the trough of the outer wall of the elastic bellows artificial muscle 1. A side plate is extended outward along a radial direction of the annular section. An end portion of the side plate is hinged to two chain plates 4 respectively located above and below the side plate by one hinge core shaft 3. A cylindrical rod is provided at each side of the side plate for connecting with spring hooks at two ends of the tension spring 5.

Figure 6:
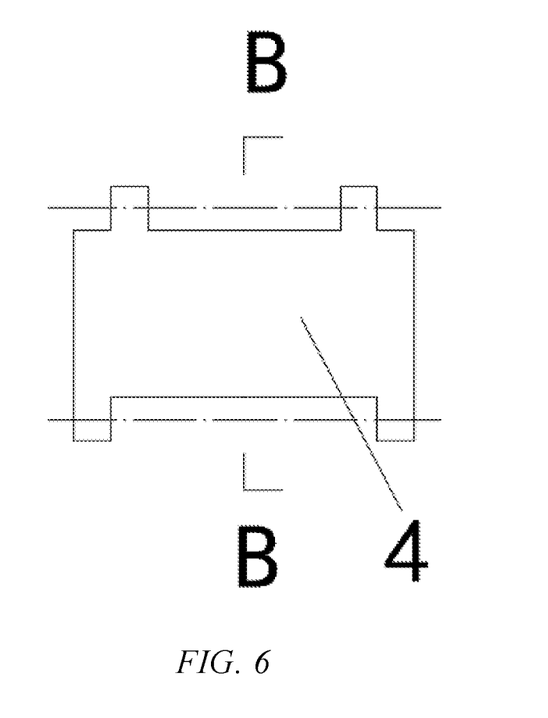
FIG. 6 is a front view of a chain plate according to the present invention.
Figure 7:
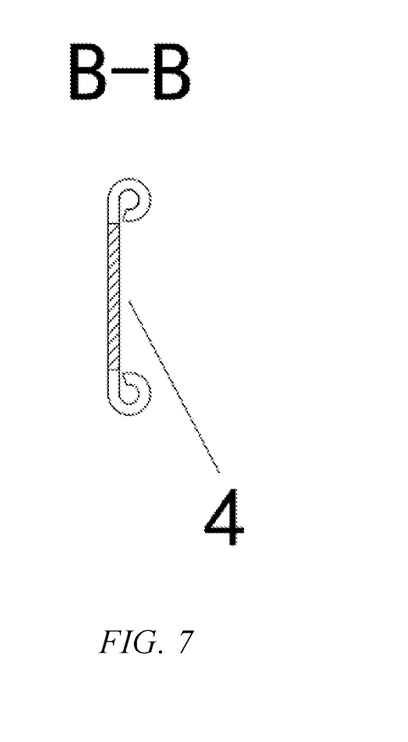
FIG. 7 is a left sectional view along a section B-B in FIG. 6.

As shown in FIG. 6 and FIG. 7, two hinge seats are provided at each of an upper end and a lower end of each chain plate 4. The end portion of the side plate of the plastic annular frame 2 connected to the chain plate is clamped at a gap between the two hinge seats at the upper end of each chain plate 4. The two hinge seats at the upper end of each chain plate 4 are fastened between the two hinge seats at the lower end of a chain plate 4 located above the each chain plate.

The plastic annular frames 2 are mounted in the troughs of the outer wall of the elastic bellows artificial muscle 1 at equal intervals or unequal intervals.

The length of the chain plate 4 is an integer multiple of a corrugation pitch of the corrugation of the elastic bellows artificial muscle 1.

A tension spring 5 is provided between two adjacent plastic annular frames 2.

A seal ring 10 is mounted between the air pipe coupling 9 and the hose coupling 7.

The elastic bellows artificial muscle 1 is made of a rubber material.

The implementation principle and process of the present invention are as follows:

The chain plate flexible finger of the present invention is driven by air pressure. During use, because of a small control volume, according to a feedback signal of a pressure transmitter, each flexible finger separately control the pressure in the inner cavity of the elastic bellows artificial muscle 1 by using a high-speed on-off valve, or any quantity of flexible fingers are connected in parallel to control the pressure in the inner cavity of the elastic bellows artificial muscle 1 by using a high-speed on-off valve.

In an original state when air is introduced, the flexible finger may be in a straight state or a bent state in a direction the same as or opposite to a bending direction of inflation.

The chain plates 4 have equal pitches or unequal pitches. A pitch length of the chain plates 4 is or is not an integer multiple of a corrugation pitch of the elastic bellows artificial muscle 1 in an original state or compressed state.

One or no tension spring 5 is provided between any two adjacent plastic annular frames 2.

The elastic bellows artificial muscle 1 is made of a rubber material. The elastic bellows artificial muscle 1 has the following four original states: (1) in the case of equal corrugation pitches, the elastic bellows artificial muscle 1 has a "U"-shaped longitudinal section shown in FIG. 3, or an "Ω"-shaped longitudinal section or a "V"-shaped longitudinal section; (2) in the case of unequal corrugation pitches, the elastic bellows artificial muscle 1 has any one of the foregoing three shapes of longitudinal sections; (3) in the case of equal corrugation pitches or unequal corrugation pitches, the elastic bellows artificial muscle 1 has a longitudinal section which is formed by any two of the three shapes of longitudinal sections; and (4) in the case of equal corrugation pitches or unequal corrugation pitches, the elastic bellows artificial muscle 1 has a longitudinal section which is formed by the three shapes of longitudinal sections.

The tension springs 5 have different performances, and have the same spring mean diameter. Any three, two or one of a thread pitch, a free length, a spring wire material, and a spring wire diameter of the tension springs 5 may be different to obtain tension springs with different elastic parameters, to mount tension springs with different elastic parameters and features at different positions in different use states.

FIG. 1 and FIG. 2 show the elastic bellows artificial muscle 1 having a combination of the "U"-shaped longitudinal section and the "Ω"-shaped longitudinal section with equal corrugation pitches in an original state. A pre-tightening force of the tension spring 5 is zero when the chain plate flexible finger is in this original state.

The elastic bellows artificial muscle 1 has adequate flexibility and may elastically bend and deform altogether at any point and in any direction, for example, elastically deform altogether in an "S" shape in the plane, and the elastic bending and deformation of the elastic bellows artificial muscle 1 have a small deformation resistance and low energy consumption.

During the inflation, the axial expansion of the elastic bellows artificial muscle 1 pushes the plastic annular frame 2 to move. The plastic annular frame 2 is subject to the framework restriction of the chain plate 4 to overcome the elastic force of the tension spring 5 to enable the chain plate flexible finger to bend, so that one or more chain plates 4 generate conformal contact with an object to be gripped, and generate a contact force for a gripping state. The application point and magnitude of the contact force are both related to the inflation pressure and the performance (the influence of the spring parameter and a pre-tightening state) of the tension spring 5.

During use, the elastic bellows artificial muscle 1 in an appropriate original state is selected, the chain plates 4 having an appropriate pitch are selected, the positions of the plastic annular frames 2 in the troughs of the elastic bellows artificial muscle 1 are adjusted, and the tension springs 5 with appropriate performances are selected, to meet the requirement of safely gripping special grip targets (for example, a soft material such as a paper cup or a peach) with different shapes, sizes and materials.

What is claimed is:

1. A chain plate flexible finger, comprising an elastic bellows artificial muscle (1), wherein the elastic bellows artificial muscle (1) is a tubular structure provided with an inner cavity in the middle, the tubular structure has a corrugated outer wall and an upper opening end which is connected to a hose coupling (7) by a clamp (6), an air pipe coupling (9) is mounted on a side surface of the hose coupling (7), and a finger mounting plate (8) is fixed on a top surface of the hose coupling (7) by a screw;

a plastic annular frame (2) is mounted in a trough of the corrugated outer wall of the elastic bellows artificial muscle (1), a chain plate (4) is mounted at a gap between two adjacent plastic annular frames (2), and a plurality of chain plates (4) are sequentially hinged in an axial direction at a side of the outer wall of the elastic bellows artificial muscle (1); and     a tension spring (5), which is mounted between an inner wall of the chain plate (4) and the outer wall of the elastic bellows artificial muscle (1), and is fixed by the plastic annular frame (2);

wherein the tension spring (5) is provided between any two adjacent plastic annular frames (2),     wherein a mounting structure of the plastic annular frame (2) comprises an annular section which is sleeved in the trough of the outer wall of the elastic bellows artificial muscle (1), a side plate is extended outward from a side of the annular section, an end portion of the side plate is hinged to two chain plates (4) which are respectively located above and below the side plate by one hinge core shaft (3), and two ends of the side plate are respectively provided with two cylindrical rods connected to spring hooks at two ends of the tension spring (5),     wherein two hinge seats are provided at each of an upper end and a lower end of each chain plate (4), the end portion of the side plate is clamped at a gap between the two hinge seats at the upper end of each chain plate (4), and the two hinge seats at the upper end of each chain plate (4) are fastened between the two hinge seats at the lower end of a chain plate (4) located above the each chain plate, and     wherein the plastic annular frames (2) are mounted in the troughs of the outer wall of the elastic bellows artificial muscle (1) at equal intervals or unequal intervals.

2. The chain plate flexible finger as claimed in claim 1, wherein a seal ring (10) is mounted between the air pipe coupling (9) and the hose coupling (7).

3. The chain plate flexible finger as claimed in claim 1, wherein the elastic bellows artificial muscle (1) is made from a rubber material, the elastic bellows artificial muscle (1) has four original states: (I) in the case of equal corrugation pitches, the elastic bellows artificial muscle (1) has a "U"-shaped longitudinal section, or an "Ω"-shaped longitudinal section or a "V"-shaped longitudinal section; (II) in the case of unequal corrugation pitches, the elastic bellows artificial muscle (1) has any one of the foregoing three shapes of longitudinal sections; (III) in the case of equal corrugation pitches or unequal corrugation pitches, the elastic bellows artificial muscle (1) has a longitudinal section which is formed by any two of the three shapes of longitudinal sections; and (IV) in the case of equal corrugation pitches or unequal corrugation pitches, the elastic bellows artificial muscle (1) has a longitudinal section which is formed by the three shapes of longitudinal sections.

4. The chain plate flexible finger as claimed in claim 1, wherein the chain plates (4) have equal pitches or unequal pitches, a pitch length of the chain plate (4) is or is not an integer multiple of a corrugation pitch of the elastic bellows artificial muscle (1) in an original state or compressed state.

\* \* \* \* \*